United States Patent
Polson et al.

(10) Patent No.: US 7,487,487 B1
(45) Date of Patent: Feb. 3, 2009

(54) DESIGN STRUCTURE FOR MONITORING CROSS CHIP DELAY VARIATION ON A SEMICONDUCTOR DEVICE

(75) Inventors: Anthony D. Polson, Jericho, VT (US); David Lackey, Jericho, VT (US); Theodoros E. Anemikos, Milton, VT (US); Laura Chadwick, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,488

(22) Filed: Apr. 1, 2008

(51) Int. Cl.
  *G06F 17/50* (2006.01)
(52) U.S. Cl. .............................. 716/6; 716/4
(58) Field of Classification Search ............ 716/2, 716/4; 714/726, 729, 731, 732, 735, 736; 324/763, 76.54
  See application file for complete search history.

(56) References Cited

U.S. PATENT DOCUMENTS

| | | | | |
|---|---|---|---|---|
| 4,215,407 A | * | 7/1980 | Gomola et al. | 700/95 |
| 4,216,528 A | * | 8/1980 | Robertson | 700/95 |
| 4,227,245 A | * | 10/1980 | Edblad et al. | 700/95 |
| 4,389,706 A | * | 6/1983 | Gomola et al. | 700/1 |
| 6,185,706 B1 | | 2/2001 | Sugasawara | |
| 6,975,956 B2 | | 12/2005 | Chang et al. | |
| 6,990,076 B1 | * | 1/2006 | McNamara et al. | 370/241 |
| 7,020,819 B2 | * | 3/2006 | Shin | 714/727 |
| 2002/0129310 A1 | * | 9/2002 | Shin | 714/727 |
| 2005/0062491 A1 | | 3/2005 | Burns et al. | |
| 2007/0001682 A1 | | 1/2007 | Habitz et al. | |
| 2007/0122922 A1 | * | 5/2007 | Crowell | 438/17 |
| 2007/0263472 A1 | | 11/2007 | Anderson et al. | |
| 2007/0285080 A1 | | 12/2007 | Abuhamdeh et al. | |

* cited by examiner

*Primary Examiner*—Stacy A Whitmore
(74) *Attorney, Agent, or Firm*—King & Spalding LLP

(57) ABSTRACT

A design structure for monitoring of the performance of semiconductor circuits, such as circuit delay, across a chip. The design structure may include a clock source and a plurality of process monitors. The design structure may be used to construct a "schmoo plot" by varying a frequency of the clock source to determine the delay of process monitors at various locations across the chip.

1 Claim, 6 Drawing Sheets

DESIGN STRUCTURE FOR MONITORING CROSS CHIP DELAY VARIATION ON A SEMICONDUCTOR DEVICE

FIELD OF THE INVENTION

This invention relates to a design structure, and more particularly to a design structure for monitoring of the performance of semiconductor circuits, such as circuit delay, across a chip.

BACKGROUND

There are many sources of performance variations of semiconductor circuits across a semiconductor die or chip. For example, fluctuations in dopant concentration and diffusion, layer thickness, etc create unavoidable random process variations from device to device. Systematic variations may be even larger, for example due to proximity effects which depend on the overall circuit layout.

Existing techniques to detect cross-chip performance variations on production designs have several drawbacks. An example of a prior art technique is shown in FIG. 1. Chip 101 includes process monitors 102, such as Performance Screen Ring Oscillators (PSROs). These process monitors 102 can be probed to determine circuit performance at various locations on the chip. However these devices are generally large and often require custom probing. Moreover, they are typically placed at the corners of the chip and thus are not useful to determine performance variations across the entire chip area.

SUMMARY OF THE INVENTION

In one aspect, the invention provides a design structure embodied in a machine readable medium. The design structure may include a clock source having a master clock output, and a plurality of identical process monitors. Each process monitor may include: a clock input receiving a clock signal; a scan input receiving a scan signal; a first memory element receiving the scan signal from the scan input and the clock signal from the clock input; a delay monitor circuit receiving the scan signal from the first memory element; a second memory element receiving the scan signal from the delay monitor circuit and the clock signal from the clock input; a clock output receiving the clock signal from the clock input; and a scan output receiving the scan signal from the second memory element. The process monitors may be distributed at substantially regular intervals across the area of a chip. The process monitors may be connected in a daisy chain structure, so that the clock output of a process monitor is connected to the clock input of a next process monitor, and the scan output of the process monitor is connected to the clock input of the next process monitor. The master clock output may be connected to the clock input of a first process monitor in the daisy chain structure.

BRIEF DESCRIPTION OF THE DRAWINGS

Embodiments of the invention will now be described with reference to the appended drawings in which.

Drawings are only diagrammatic and not to scale. Corresponding elements in different drawings are indicated by the same numerals.

DETAILED DESCRIPTION

Figure 1:
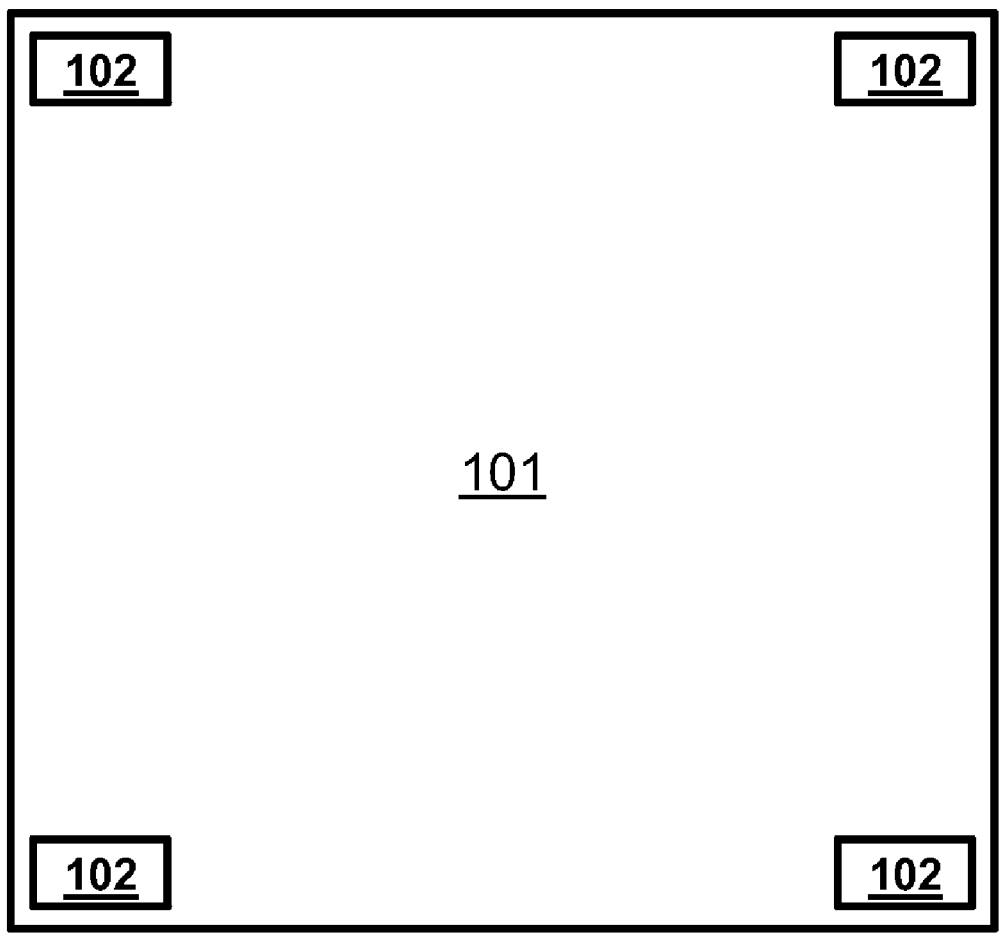
FIG. 1 shows an example of a prior art technique for measuring cross-chip performance variations.
Figure 2:
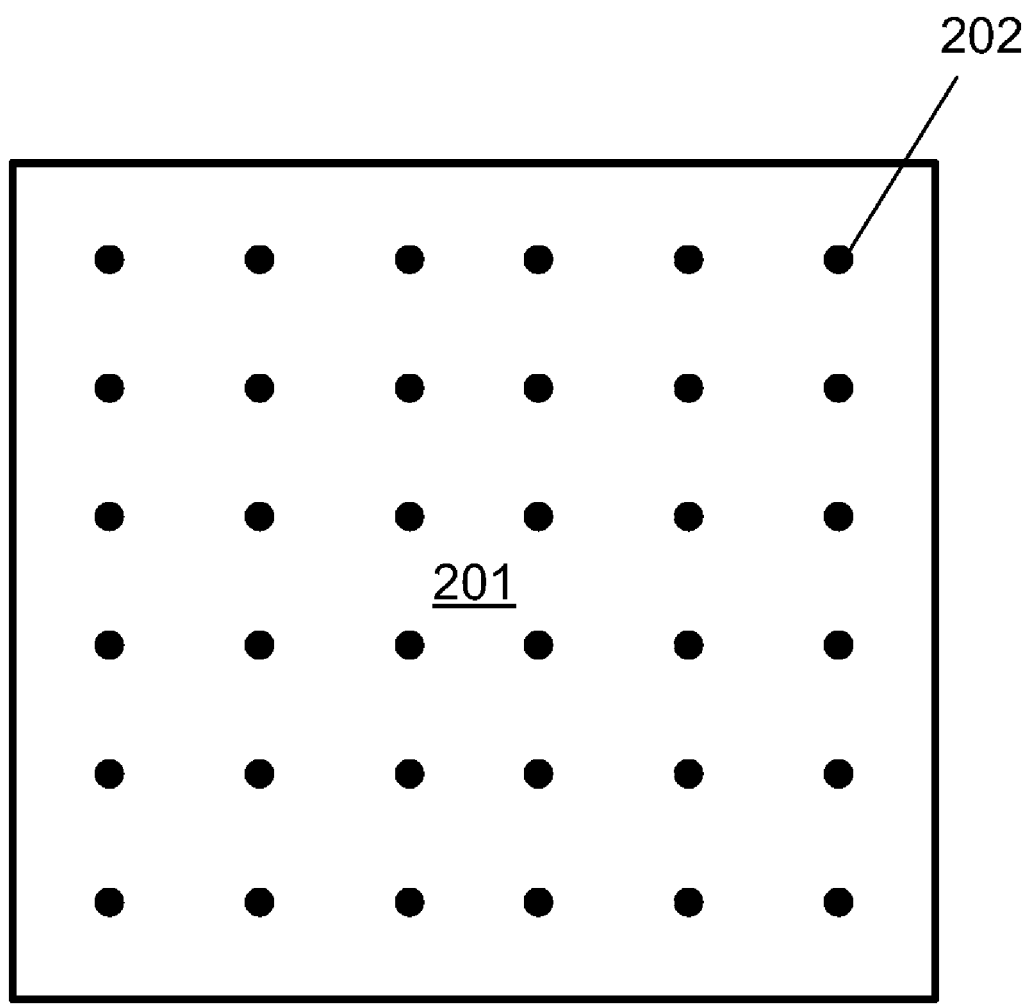
FIG. 2 shows a semiconductor chip in an embodiment of the invention.

FIG. 2 shows a semiconductor chip in an embodiment of the invention. Chip 201 includes one or more process monitors 202, which may be for example distributed over the entire chip area at regular intervals. Due to their small size, the process monitors 202 can easily be replicated and distributed throughout the design. The process monitors 202 can be either floorplanned in, or inserted as a post-design step. Each process monitor 202 is small enough that it will have minimal effect on the systematic effects being measured.

Figure 3:
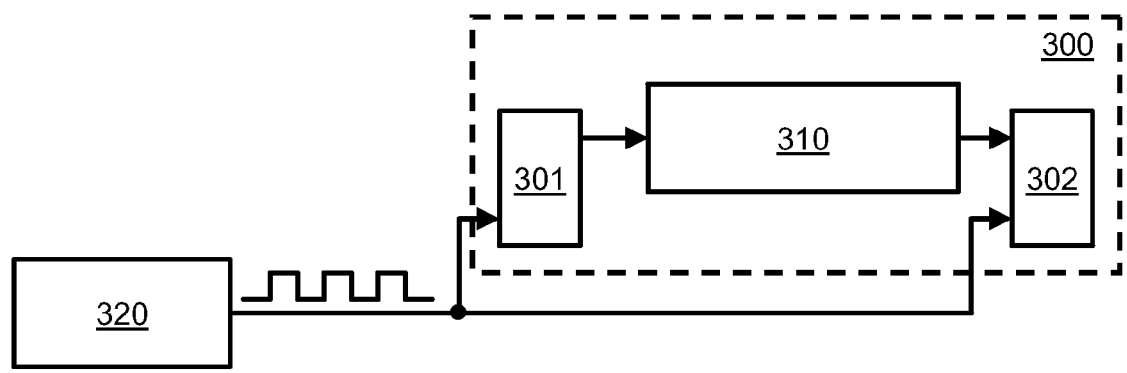
FIG. 3 shows the use of a process monitor as part of an At-Speed Structural Test (ASST) system in an embodiment of the invention.

FIG. 3 shows the use of a process monitor as part of an At-Speed Structural Test (ASST) system in an embodiment of the invention. The system may include a process monitor 300 including two memory elements 301 and 302, such as latches or flip-flops, and a delay monitor circuit 310. The delay monitor circuit 310 may be a reference circuit that provides a fair estimate of the average circuit performance of the devices at a specific location on a chip. The system may also include a clock source 320 providing a clock signal to the process monitor 300.

Figure 5:
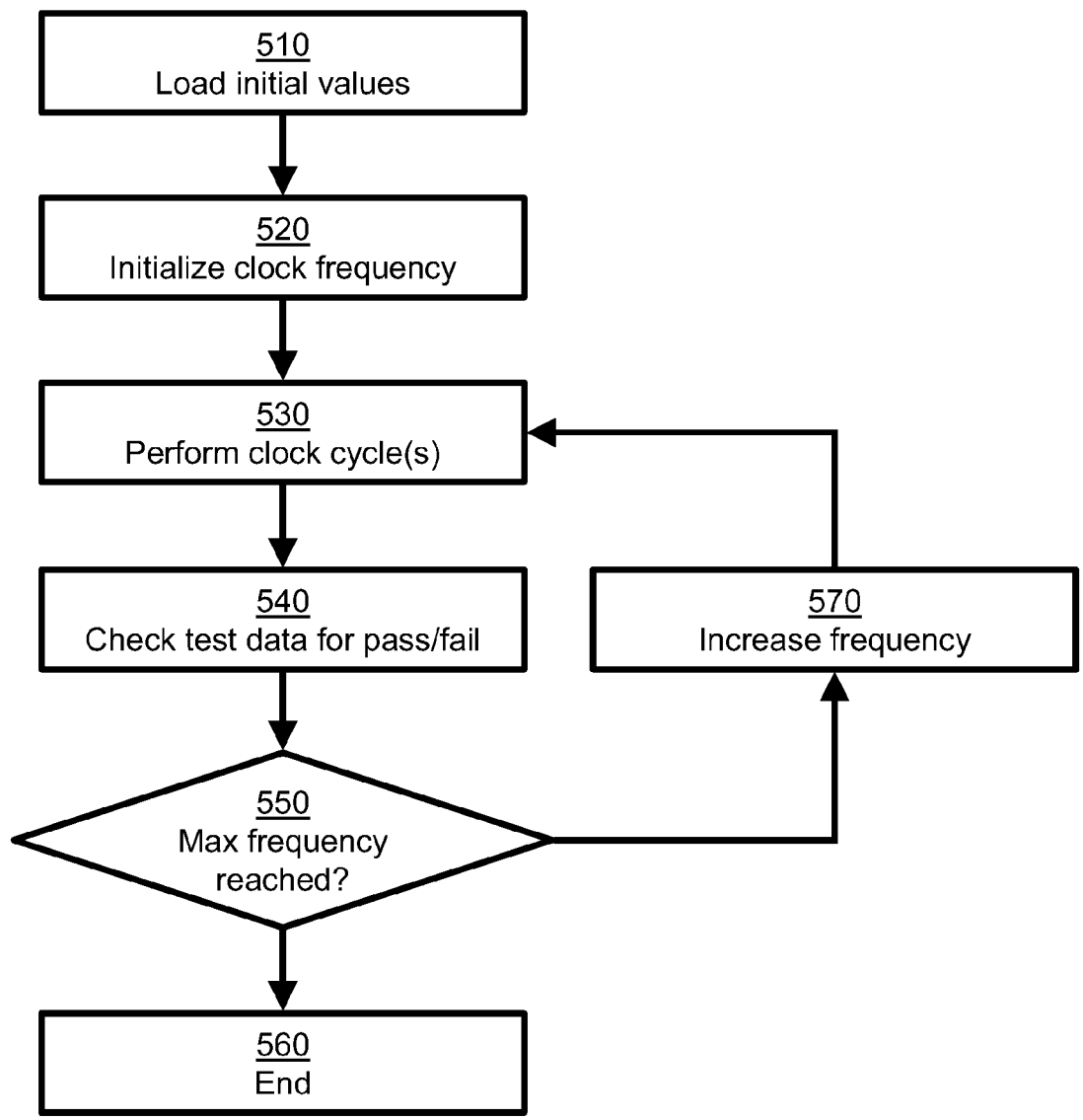
FIG. 5 shows a method of operation in an embodiment of the invention.

FIG. 5 shows a method of operation in an embodiment of the invention. The method may begin at step 510 by loading initial values in all memory elements. At step 520, a clock frequency may be set to an initial value, for example a frequency at which a user is confident that a delay monitor circuit will perform correctly. At step 530, one or more clock cycles may be performed. At step 540, the test data are checked for a pass/fail result to verify whether the delay monitor circuit properly performs at the current frequency. At step 550, it is determined whether the maximum value of frequency has been reached. If the maximum value of frequency has been reached, the method ends at step 560. Otherwise, the frequency may be increased by a certain amount at step 570, and the method goes back to step 530. This process may result in the determination of a maximum clock frequency that devices at a specific location on a chip can tolerate.

Information collected from a plurality of process monitors 300 may be used to produce a "schmoo plot" identifying the allowable operating conditions of the delay monitor circuit 310. A schmoo plot is typically drawn on an X-Y plane where the axes correspond to operation parameters, for example clock frequency and operating voltage. A schmoo plot allows the rapid identification of areas in parameter space where a device functions correctly. Embodiments of the present invention may be used to create a schmoo plot whose axes correspond, for example, to the clock frequency and/or locations across a chip or wafer.

The insertion of an ASST shmooable latch-to-latch path periodically throughout a chip may allow the monitoring of circuit performance in a given chip region. The path may be connected to a clock that may be frequency shmooed through the test process. Since this capability already exists on ASST-testable application-specific integrated circuits (ASICs), the addition of the shmooable path has very little overhead.

The clock source 310 may take different forms. In one embodiment of the invention, the clock source may include for example a dedicated phase-locked loop (PLL) and de-skewer (DSK) to create a performance-monitoring clocking domain separate from any other functional clocking domain. Alternatively, an existing PLL may be reused, but accompanied by a separate DSK for performance-monitoring domain only. Finally, both the PLL and DSK may be shared with an existing functional clocking domain. This last solution saves chip area but adds uncertainty due to the functional clock load. In this case, the macro may require a buffer to improve the slew rate of the clock signal.

Figure 4:
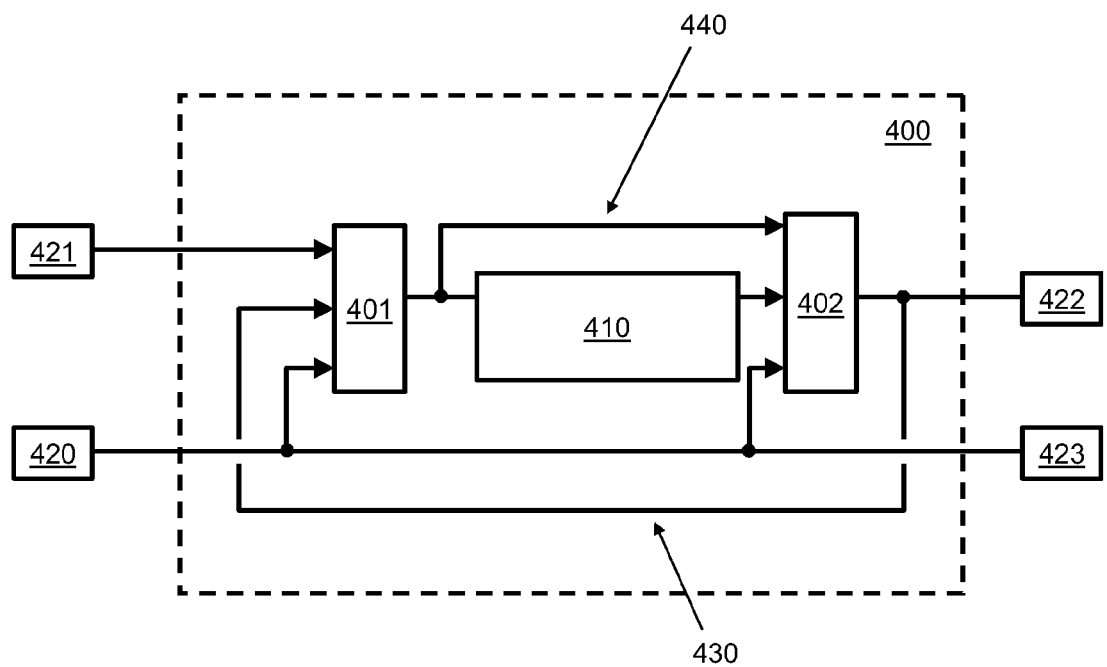
FIG. 4 shows the basic macro implementing the process monitor in an embodiment of the invention.

FIG. 4 shows the basic macro implementing the process monitor in an embodiment of the invention. Process monitor 400 may be for example a hard macro, placed as a regular structure across the chip. The process monitor 400 may include two memory elements 401 and 402, and a delay monitor circuit 410. The delay monitor circuit 410 may be an inverting or non-inverting circuit. The process monitor 400 may receive a clock input from terminal 420 and a scan input from terminal 421, and may provide a scan output to terminal 422. The scan-in and scan-out signals may be single-bit or multiple-bit signals. The process monitor 400 may also copy its clock input to a clock output at terminal 423. The inclusion of the scan-in and scan-out terminals 421 and 422 allows the use of the process monitor 400 as part of a scan-test system as is known in the art.

The process monitor 400 may also include a feedback path 430, which may be used to transmit the output of memory element 402 back to the input of the memory element 401. This allows the process monitor to essentially function as a stand-alone element once it has been initialized, without requiring further data inputs from scan-in terminal 421. If the delay monitor circuit 410 is an inverting circuit, the feedback path 430 may be a non-inverting path. If instead the delay monitor circuit 410 is a non-inverting circuit, the feedback path 430 is preferably an inverting path including an inverting function. This allows the signal to be inverted at each clock cycle and avoids the problem of having identical signals along the entire loop formed by elements 401, 410 and 402, which would not permit proper testing. The scan path 440 may be used to bypass the delay monitor circuit 410 during the initialization of the process monitor.

The process monitor 400 may also include a scan path 440, which may be used to bypass the delay monitor circuit 410. This facilitates the loading of data into memory element 402 during the initialization of the process monitor.

The distribution of the clock signal to various process monitors may be accomplished in several ways. For example, a parallel clock tree may be used to distribute the clock signal in parallel to all macros. This approach has the advantage of being similar to typical clock domains. Alternatively, the clock-output terminal 423 of the basic macro may be used to daisy-chain multiple process monitors with a single master clock input. This reduces the wiring requirements and the load on the clock driver, and also reduces switching noise associated with clock distribution. Hybrid solutions may also be employed, where a clock tree with few branches carries the clock signal to relatively large areas of the chip, and process monitors are daisy-chained within each area.

The embodiments of FIGS. 3-4 relate to the testing of the propagation delay of a process monitor, which is repeated across the area of the semiconductor chip as shown in FIG. 2. Such embodiments may also employ different process monitors tailored to test different types of circuits, for example transistors with different values of threshold voltage (e.g., "high $V_T$" and/or "low $V_T$" transistors). In one embodiment, a plurality of process monitors, each tailored to test a specific circuit, may be arranged within a single macro which is then repeated across the chip. In another embodiment, each macro may include a single process monitor, and the different macros may be independently arranged across the area of the chip. The invention may also be applied to the testing of the electrical properties of other integrated circuit components, such as the propagation delay along metallization wires.

Figure 6:
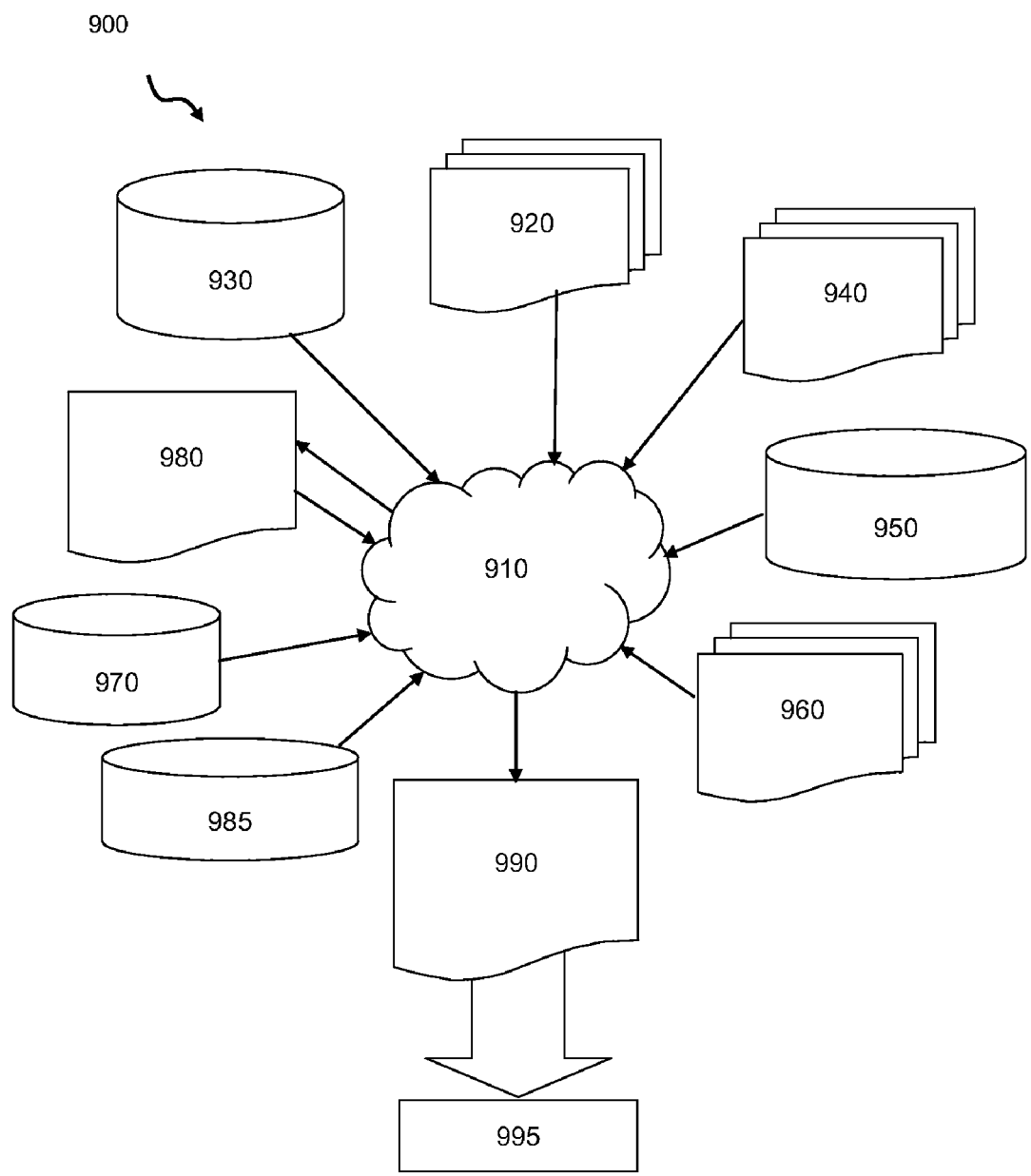
FIG. 6 is a flow diagram of a design process used in semiconductor design, manufacture, and/or test.

FIG. 6 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the invention as shown in FIGS. 1-4 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIGS. 1-4. Design process 910 preferably synthesizes (or translates) an embodiment of the invention as shown in FIGS. 1-4 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 1-4, along with any additional integrated circuit design or data (if applicable), into a second design structure 990. Design structure 990 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-4. Design structure 990 may then proceed to a stage 995 where, for example, design structure 990: proceeds to tape-out, is released to manufacturing, is released to a mask house, is sent to another design house, is sent back to the customer, etc.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in conjunction with specific embodiments, it will be appreciated that such embodiments are not limiting. Accordingly, numerous alternatives, modifications, and variations are possible within the scope of the appended claims.

We claim:

1. A design structure for use as an input to a design flow embodied in a storage device, the design structure comprising:
   a clock source having a master clock output;
   a plurality of identical process monitors, each process monitor including:
     a clock input receiving a clock signal;
     a scan input receiving a scan signal;
     a first memory element receiving the scan signal from the scan input and the clock signal from the clock input;
     a delay monitor circuit receiving the scan signal from the first memory element;
     a second memory element receiving the scan signal from the delay monitor circuit and the clock signal from the clock input;
     a clock output receiving the clock signal from the clock input; and
     a scan output receiving the scan signal from the second memory element;
   wherein the process monitors are distributed at substantially regular intervals across the area of a chip;
   wherein the process monitors are connected in a daisy chain structure, so that the clock output of a process monitor is connected to the clock input of a next process monitor, and the scan output of the process monitor is connected to the clock input of the next process monitor; and
   wherein the master clock output is connected to the clock input of a first process monitor in the daisy chain structure.

* * * * *